(12) United States Patent
Hayasaka

(10) Patent No.: US 6,937,929 B2
(45) Date of Patent: Aug. 30, 2005

(54) FORCE-FEEDBACK INPUT DEVICE

(75) Inventor: Satoshi Hayasaka, Miyagi-ken (JP)

(73) Assignee: Alps Electric Co., Ltd., Tokyo (JP)

(*) Notice: Subject to any disclaimer, the term of this patent is extended or adjusted under 35 U.S.C. 154(b) by 0 days.

(21) Appl. No.: 10/963,319

(22) Filed: Oct. 12, 2004

(65) Prior Publication Data

US 2005/0090980 A1 Apr. 28, 2005

(30) Foreign Application Priority Data

Oct. 23, 2003 (JP) ............................ 2003-363500

(51) Int. Cl.[7] .................................... B62D 11/00
(52) U.S. Cl. ................. 701/42; 701/36; 701/41; 701/51; 180/316
(58) Field of Search ................... 701/36–38, 41–44, 701/51; 180/315, 316, 33

(56) References Cited

U.S. PATENT DOCUMENTS

| | | | | | |
|---|---|---|---|---|---|
| 3,692,160 | A | * | 9/1972 | Hilpert ..................... | 192/221 |
| 4,297,918 | A | * | 11/1981 | Perry ....................... | 476/10 |
| 4,513,235 | A | * | 4/1985 | Acklam et al. ............ | 318/685 |
| 4,516,063 | A | * | 5/1985 | Kaye et al. ................ | 318/685 |
| 5,456,333 | A | * | 10/1995 | Brandt et al. ............. | 180/336 |
| 6,405,158 | B1 | * | 6/2002 | Massie et al. ............. | 703/6 |
| 6,636,161 | B2 | * | 10/2003 | Rosenberg ................. | 341/20 |
| 6,850,806 | B2 | * | 2/2005 | Yutkowitz ................. | 700/54 |
| 6,853,965 | B2 | * | 2/2005 | Massie et al. ............. | 703/6 |

FOREIGN PATENT DOCUMENTS

JP  2003-150261  5/2003

* cited by examiner

Primary Examiner—Richard M. Camby
(74) Attorney, Agent, or Firm—Brinks Hofer Gilson & Lione

(57) ABSTRACT

A force-feedback input device includes an operating unit manipulated by an operator, a detecting unit for detecting the operational state of the operating unit, a force-feedback unit for providing a force feedback to the operating unit, and a controlling unit for controlling the operation of the force-feedback unit to provide a predetermined force feedback according to the operational state of the operating unit to the operating unit. The controlling unit includes an operational-state-calculating subunit, a returning-force-calculating subunit, a damping-force-calculating subunit, and a resultant-force-calculating subunit. The damping-force-calculating subunit calculates the damping coefficient by multiplying a returning force calculated in the returning-force-calculating subunit by the required proportionality coefficient and then calculates a damping force by multiplying the obtained damping coefficient by an operation speed of the operating unit.

3 Claims, 6 Drawing Sheets

FORCE-FEEDBACK INPUT DEVICE

This application claims the benefit of priority to Japanese Patent Application No. 2003-363500 filed on Oct. 23, 2003, herein incorporated by reference.

BACKGROUND OF THE INVENTION

1. Field of the Invention

The present invention relates to force-feedback input devices, and in particular, relates to a unit for optimizing a damping force of a damping-force-feedback input device which applies to an operating unit a returning force according to an operating position of the operating unit and the damping force in proportion to an operating speed of the operating unit.

2. Description of the Related Art

A force-feedback input device including an operating unit manipulated by an operator, a detecting unit for detecting the operational state of the operating unit, a force-feedback unit for providing a force feedback to the operating unit, and a controlling unit for controlling the operation of the force-feedback unit based on detection signals output from the detecting unit so as to provide a predetermined force feedback according to the operational state of the operating unit to the operating unit has been used in practical applications as an input device applicable to, for example, a bi-wire central controlling unit for automobile-installed electrical equipment, a steering device, a gearshift device, and a braking device. The force-feedback input device controls the operation of the force-feedback unit in the controlling unit and provides to the operating unit a force feedback, for example, a feeling that the operating unit touches a wall (referred to as a wall-touching sensation hereinafter), according to the operating position of the operating unit.

As disclosed in Japanese Unexamined Patent Application Publication No. 2003-150261, several types of force-feedback input device have been proposed: a type which provides to the operating unit a proper resistance during the operation of the operating unit and a type which provides an additional force feedback in proportion to the operation speed of the operating unit. This provides an operating unit with a superior operating feeling.

One example of the force feedback according to the operating position of the operating unit, namely, a force feedback in proportion to the movement of the operating unit rather than a force feedback having a constant magnitude regardless of the movement, is called an elastic force. A force feedback in proportion to the operation speed of the operating unit is called a damping force and is obtained by multiplying the operation speed of the operating unit by the damping coefficient. Since the damping force provides a resistance similar to viscous friction when operating the operating unit, the damping force may be called a viscous frictional force.

FIG. 4 is a block diagram of a type of a force-feedback input device which was proposed by the present inventor. This force-feedback input device mainly includes an operating unit 1 manipulated by an operator, a detecting unit 2 for detecting the operational state of the operating unit 1, a force-feedback unit 3 for providing a force feedback to the operating unit 1, and a controlling unit 4 for controlling the operation of the force-feedback unit 3 so as to provide to the operating unit 1 a predetermined force feedback according to the operational state of the operating unit 1.

The controlling unit 4 includes an operational-state-calculating subunit 4a for calculating the movement θ and the operation speed θdot of the operating unit 1 based on detection signals output from the detecting unit 2, a returning-force-calculating subunit 4b for calculating a required returning force Te(θ) according to the movement θ of the operating unit 1, a damping-force-calculating subunit 4c for calculating the damping force c·θdot in proportion to the operation speed θdot of the operating unit 1, and a resultant-force-calculating subunit 4d for calculating the resultant force Te(θ)−c·θdot derived from the combination of the returning force Te(θ) and the damping force c·θdot. The controlling unit 4 controls the operation of the force-feedback unit 3 based on the signals output from the resultant-force-calculating subunit 4d so as to provide a required force feedback to the operating unit 1.

Referring to FIG. 5, the operation of the known force-feedback input device having the above-described structure when an encoder is used as the detecting unit 2 will now be described.

When power is supplied to the controlling unit 4, in step S11 the controlling unit 4 counts the number n of signal pulses output from an encoder, i.e., the detecting unit 2, for a predetermined time Δt. In step S12, the controlling unit 4 calculates the movement θ of the operating unit 1 based on the equation θ=θ+n and calculates the operation speed θdot of the operating unit 1 based on the equation θdot=n/Δt in the operational-state-calculating subunit 4a. In step S13, the controlling unit 4 calculates the returning force Te based on the equation Te=k(θ−θ$_0$) when θ$_0$≦θ≦θ$_1$ or the equation Te=k(θ$_1$−θ$_0$) when θ$_1$<θ in the returning-force-calculating subunit 4b and calculates the damping force Tc based on the equation Tc=c·θdot in the damping-force-calculating subunit 4c, where k is the elastic coefficient and θ$_0$ is the base position of the operating unit 1 and c is the damping coefficient. When θ$_0$≦θ≦θ$_1$, an elastic force in proportion to the movement is provided. When θ$_1$<θ, a constant force is provided. This constant force has the same value as the elastic force when θ=θ$_1$. In step S14, the controlling unit 4 calculates the resultant force Ttotal of the returning force Te and the damping force Tc which is provided to the operating unit 1 based on the equation Ttotal=Te−Tc in the resultant-force-calculating subunit 4d. In step S15, the controlling unit 4 operates the force-feedback unit 3 based on the resultant force Ttotal output from the resultant-force-calculating subunit 4d, and a required force feedback is provided to the operating unit 1.

In the force-feedback input device having the above-described structure, the damping force Tc and the returning force Te are provided to the operating unit 1. Thus, a resistance is provided to the operating unit 1 and a superior operating feeling of the operating unit 1 can be achieved. When θ$_0$≦θ≦θ$_1$, the returning force is large in proportion to the movement, that is, the elastic force is provided so as to suppress oscillation at the position θ$_0$.

SUMMARY OF THE INVENTION

In a known force-feedback input device, the damping force is proportional only to the operation speed and is independent of the returning force. Accordingly, when an operating unit is released at a position, for example θ$_2$, where a predetermined returning force is applied, the returning speed of the operating unit changes at a point, for example θ$_1$, where the returning force changes. Thus, an operator disadvantageously experiences an uncomfortable feeling.

In view of the above problem with the related art, the object of the present invention is to provide a force-feedback input device including an operating unit, the returning speed of which does not change at the position where the returning force changes, and not giving an uncomfortable feeling to the operator.

To provide a solution to the above problem, a force-feedback input device according to the present invention includes an operating unit manipulated by an operator, a detecting unit for detecting the operational state of the operating unit, a force-feedback unit for providing a force feedback to the operating unit, and a controlling unit for controlling the operation of the force-feedback unit based on detection signals output from the detecting unit. The controlling unit includes a returning-force-calculating subunit for calculating a returning force based on the operating position of the operating unit, a damping-force-calculating subunit for calculating a damping force based on the operation speed and the damping coefficient of the operating unit, and a resultant-force-calculating subunit for calculating a resultant force based on the returning force and the damping force. The damping-force-calculating subunit calculates the damping coefficient based on the returning force. The damping-force-calculating subunit may calculate the damping coefficient by multiplying the returning force by the proportionality coefficient.

When the damping-force-calculating subunit calculates the damping coefficient based on the returning force, the returning speed of the operating unit does not change at a point where the damping force changes. Thus, the operator does not experience an uncomfortable feeling, and an operating unit is provided with a superior operating feeling.

Moreover, in the force-feedback input device according to the present invention having the above structure, the returning force gradually increases from a returning start point to a predetermined position.

When the returning force gradually increases from the returning start point to the predetermined position, the damping force gradually changes according to the returning force around the returning start point and does not sharply change. An impact force therefore has little effect on the operating unit around the returning start point. A superior operating feeling can thus be achieved.

DESCRIPTION OF THE PREFERRED EMBODIMENT

Figure 1:
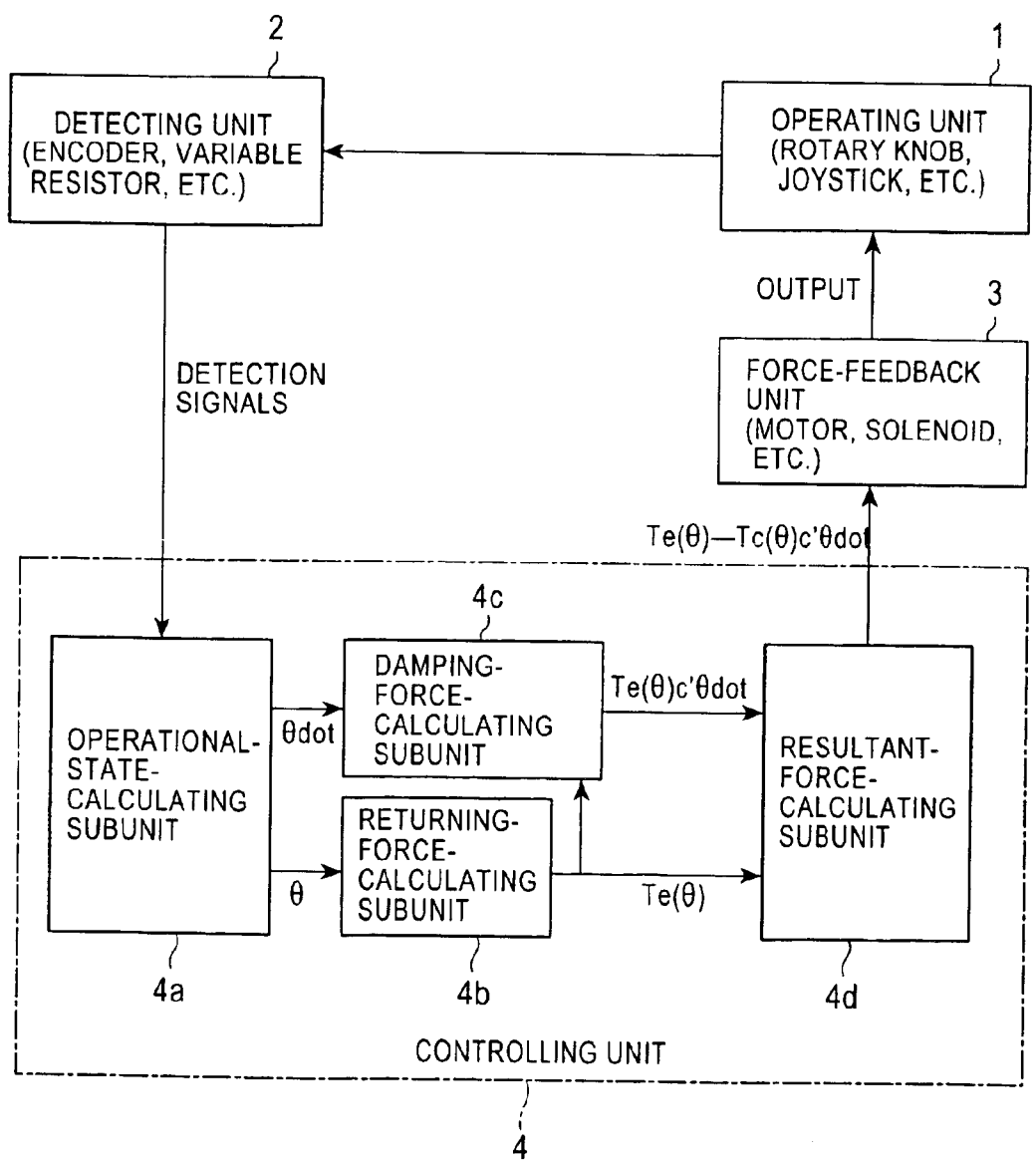
FIG. 1 is a block diagram of a force-feedback input device according to an embodiment.
Figure 2:
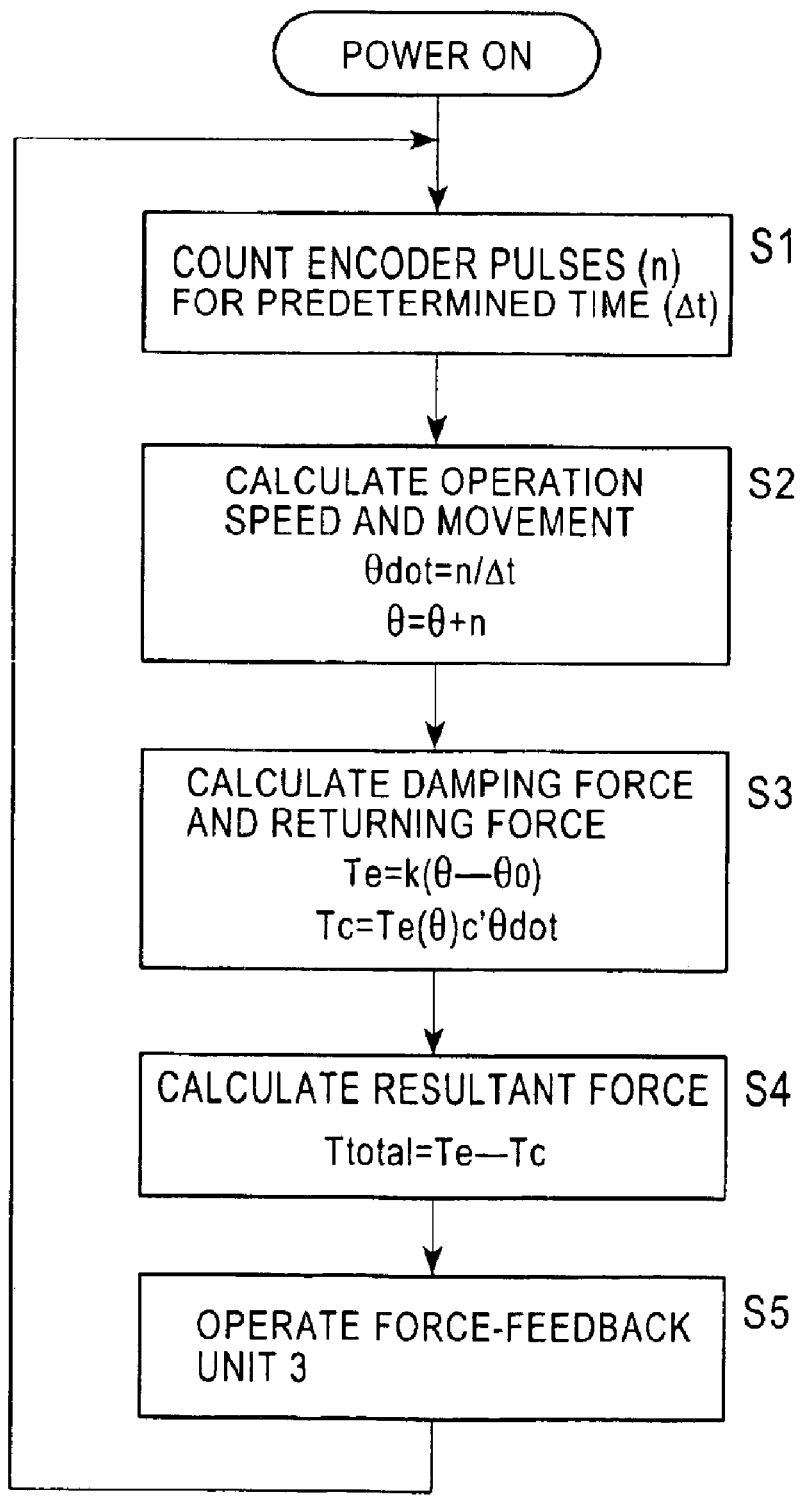
FIG. 2 is a flow chart illustrating a procedure for controlling a force-feedback unit in the force-feedback input device according to the embodiment.
Figure 3:
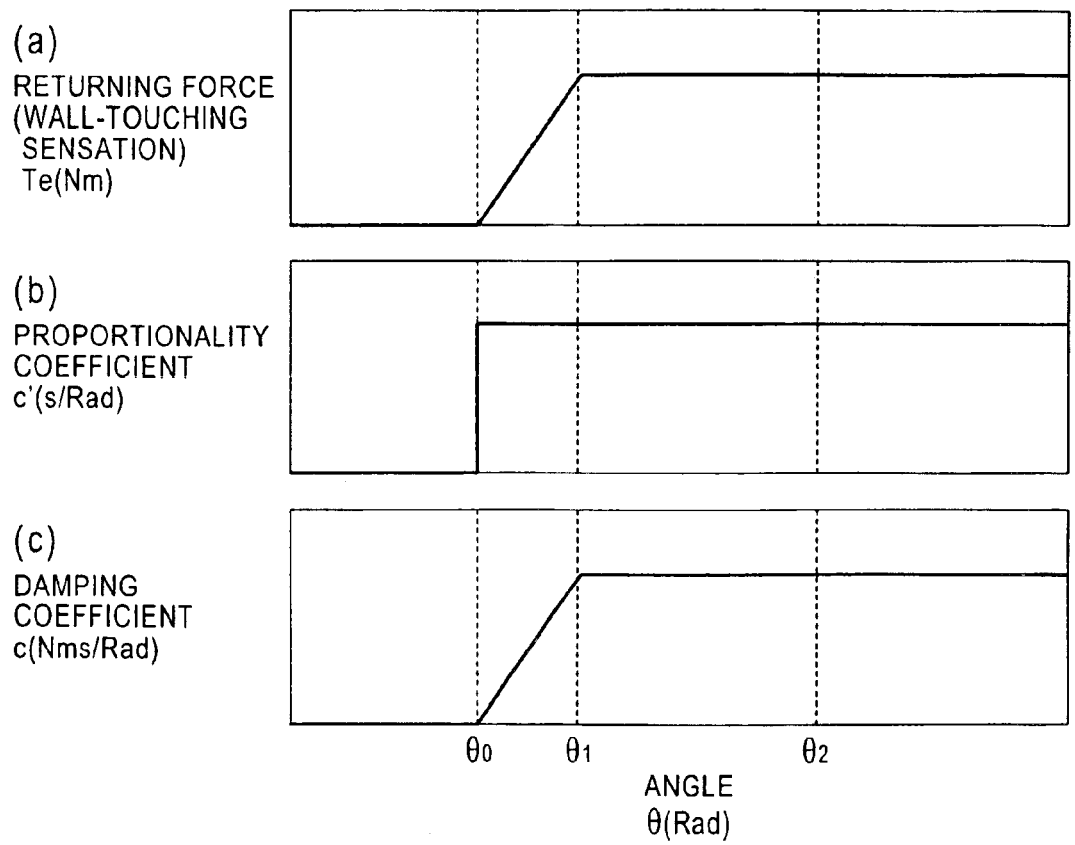
FIG. 3 includes graphs illustrating relationships among a returning force, a proportionality coefficient, and a damping coefficient in the force-feedback input device according to the embodiment.

Referring to FIGS. 1 to 3, an embodiment of a force-feedback input device according to the present invention will now be described. FIG. 1 is a block diagram of a force-feedback input device according to an embodiment. FIG. 2 is a flow chart illustrating a procedure for controlling a force-feedback unit in the force-feedback input device according to the embodiment. FIG. 3 includes graphs illustrating relationships among a returning force, a proportionality coefficient, and a damping coefficient in the force-feedback input device according to the embodiment.

Figure 4:
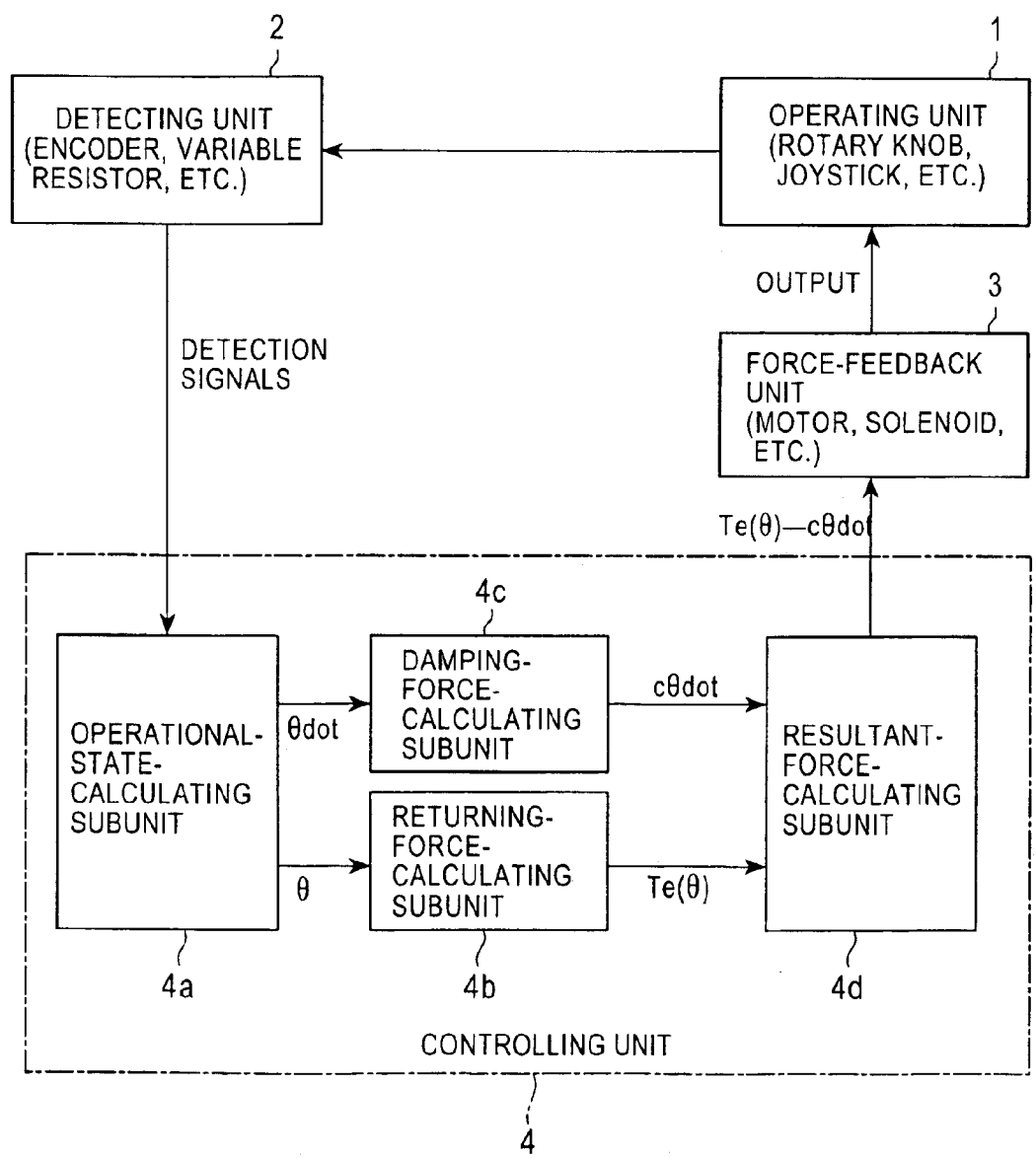
FIG. 4 is a block diagram of a known force-feedback input device.
Figure 5:
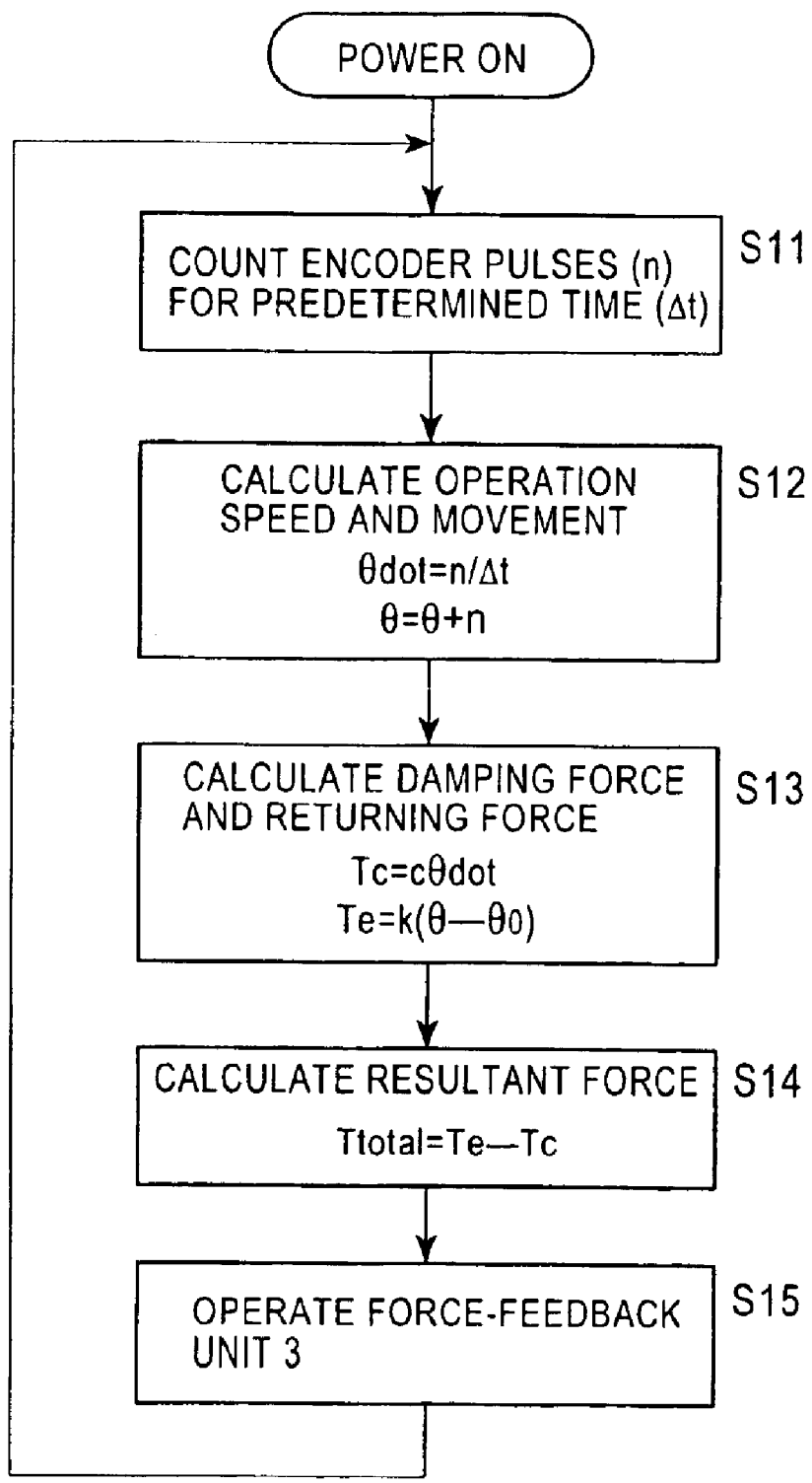
FIG. 5 is a flow chart illustrating a procedure for controlling a force-feedback unit in the known force-feedback input device.
Figure 6:
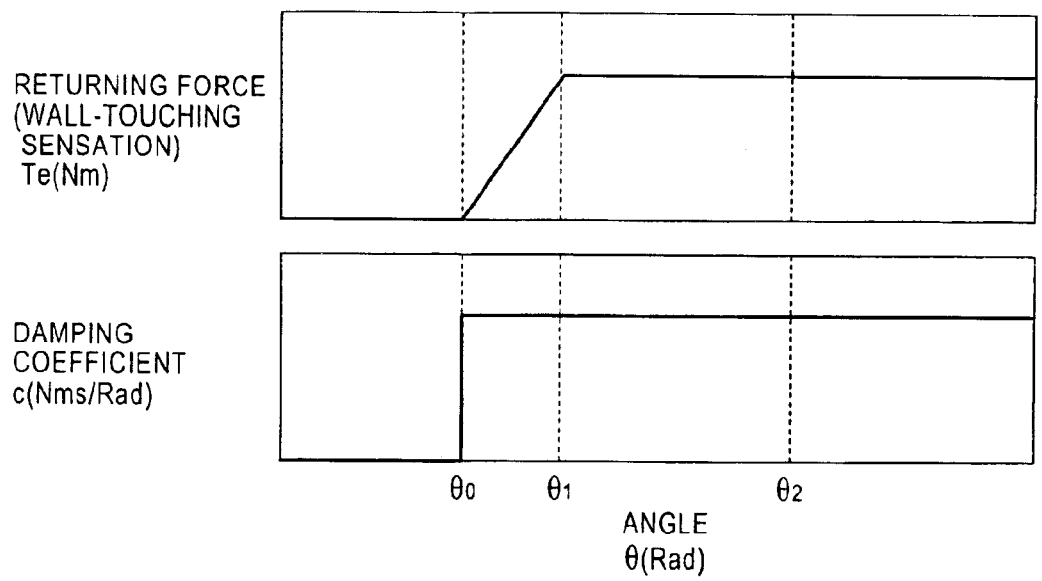
FIG. 6 includes graphs illustrating a relationship between a returning force and a damping coefficient in the known force-feedback input device.

As shown in FIG. 1, the force-feedback input device of this embodiment has the same basic structure as the known force-feedback input device shown in FIG. 4. The force-feedback input device mainly includes an operating unit 1 manipulated by an operator, a detecting unit 2 for detecting the operational state of the operating unit 1, a force-feedback unit 3 for providing a force feedback to the operating unit 1, and a controlling unit 4 for controlling the operation of the force-feedback unit 3 so as to provide a predetermined force feedback according to the operational state of the operating unit 1 to the operating unit 1. The controlling unit 4 includes an operational-state-calculating subunit 4a, a returning-force-calculating subunit 4b, a damping-force-calculating subunit 4c, and a resultant-force-calculating subunit 4d.

An operator manually manipulates the operating unit 1. A rotary knob, a rocking lever, or a joystick, for example, is used as the operating unit 1 according to the application of the force-feedback input device.

The detecting unit 2 converts the movement and the moving direction of the operating unit 1 to electrical quantities. An encoder or a variable resistor, for example, is used as the detecting unit 2. In general, a detecting unit capable of outputting two-phase signal pulses is used as the detecting unit 2.

The force-feedback unit 3 provides a required force feedback to the operating unit 1. A rotary motor, a linear motor, or a solenoid, for example, is used as the force-feedback unit 3. When a linear motor, or a solenoid is used as the force-feedback unit 3, a power-transmitting device for converting a linear motion of the force-feedback unit 3 to a rotational motion and transmitting the rotational motion to the operating unit 1 is disposed between the force-feedback unit 3 and the operating unit 1.

As shown in parts (a), (b), and (c) of FIG. 3, the controlling unit 4 stores the relationship between the movement $\theta$ and the returning force Te of the operating unit 1, the relationship between the movement $\theta$ and the proportionality coefficient c' of the operating unit 1, and the relationship between the movement $\theta$ and the damping coefficient c of the operating unit 1 as graphs. As shown in part (a) of FIG. 3, when $\theta_0 \leq \theta \leq \theta_1$, an elastic force in proportion to the movement is provided as the returning force Te. When $\theta_1 < \theta$, a constant force is provided as the returning force Te. This constant force has the same value as the elastic force when $\theta = \theta_1$. As shown in part (b) of FIG. 3, the proportionality coefficient c' is set at a constant value. As shown in part (c) of FIG. 3, the damping coefficient c is set so as to have values in proportion to the returning force Te.

In the known force-feedback input device, the damping force c·$\dot{\theta}$ is obtained merely by multiplying the operation speed $\dot{\theta}$ of the operating unit 1 by the damping coefficient c. On the other hand, in the damping-force-calculating subunit 4c included in the controlling unit 4 in the force-feedback input device of this embodiment, the damping coefficient c, i.e., Te($\theta$)·c', is first obtained by multiplying the returning force Te($\theta$) calculated in the returning-force-calculating subunit 4b by the required proportionality coefficient c'. Then, the damping force Te($\theta$)·c'·$\dot{\theta}$ is obtained by multiplying the obtained damping coefficient c by the operation speed $\dot{\theta}$ of the operating unit 1. When the damping coefficient c, i.e., Te($\theta$)·c', is obtained by multiplying the returning force Te($\theta$) by the required proportionality coefficient c', the damping coefficient c has values in proportion to the returning force Te($\theta$) as shown in part (c) of FIG. 3. Thus, the damping force gradually changes according to the returning force around a returning start point. An impact force therefore has little effect on the operating unit around the returning start point. A superior operating feeling can be thereby achieved. Moreover, since the damping coefficient c has values in proportion to the returning force Te(θ), the returning speed of the operating unit 1 is independent of the returning force when an operator releases the operating unit 1. At the point where the returning force changes, the returning speed of the operating unit does not change. Thus, the operator experiences a normal operating feeling.

The proportionality coefficient c', which can be set at any value, is set at a value that lowers the impact on and does not practically cause a problem to the operating unit 1 so that a better operating feeling of the operating unit 1 and the device can be achieved.

Referring to FIG. 2, the procedure for controlling the force-feedback unit in the force-feedback input device according to the embodiment will now be described.

When power is supplied to the controlling unit 4, in step S1 the controlling unit 4 counts the number n of signal pulses output from an encoder, i.e., the detecting unit 2, for a predetermined time Δt. In step S2, the controlling unit 4 calculates the movement θ of the operating unit 1 based on the equation θ=θ+n and calculates the operation speed θdot of the operating unit 1 based on the equation θdot=n/Δt in the operational-state-calculating subunit 4a. In step S3, the controlling unit 4 calculates the returning force Te based on the equation Te=k(θ−θ$_0$) when θ$_0$≦θ≦θ$_1$ or the equation Te=k(θ$_1$−θ$_0$) when θ$_1$<θ in the returning-force-calculating subunit 4b and calculates the damping force Tc based on the equation Tc=Te(θ)·c'·θdot in the damping-force-calculating subunit 4c, where k is the elastic coefficient and θ$_0$ is the base position of the operating unit 1 and c' is the proportionality coefficient. When θ$_0$≦θ≦θ$_1$, an elastic force in proportion to the movement is provided. When θ$_1$<θ, a constant force is provided. This constant force has the same value as the elastic force when θ=θ$_1$. In step S4, the controlling unit 4 calculates the resultant force Ttotal of the returning force Te and the damping force Tc which is provided to the operating unit 1 based on the equation Ttotal=Te−Tc in the resultant-force-calculating subunit 4d. In step S5, the controlling unit 4 operates the force-feedback unit 3 based on the resultant force Ttotal output from the resultant-force-calculating subunit 4d, and a required force feedback is provided to the operating unit 1.

The effects of the force-feedback input device according to the embodiment will now be described from the viewpoint of mechanics.

According to Newton's equation of motion, the returning force acting on the operating unit 1 is represented by the following equation (1):

$$Te=J[|\$]\$\ddot{g\ddot{v}}+c\dot{\theta}+Tf \qquad (1)$$

where
Te: returning force
J: moment of inertia
c: damping coefficient
Tf: Coulomb friction
θ: position Of the returning force acting on the operating unit 1, the Coulomb friction Tf is many orders of magnitude smaller than the acceleration component, which is the first term of equation (1), and the velocity component, which is the second term of equation (1). Thus, the Coulomb friction Tf can be disregarded in a production device, and Newton's equation of motion when the Coulomb friction Tf is disregarded is represented by the following equation (2):

$$Te=J[|\$]\$\ddot{g\ddot{v}}+c\dot{\theta} \qquad (2)$$

The following equation (3) is obtained by solving equation (2), assuming that the initial velocity of the operating unit 1 is 0:

$$\dot{\theta} = \frac{Te}{c}(1 - e^{-\frac{c}{J}t}) \qquad (3)$$

When the time t is infinite, the above equation (3) is modified to the following equation (4):

$$\dot{\theta} = \frac{Te}{c} \qquad (4)$$

Equation (4) shows the effect when the damping force is provided to the operating unit 1. The returning speed of the operating unit 1 can be reduced to the ratio of the returning force Te to the damping coefficient c.

In the present invention, the damping coefficient c is calculated by multiplying the proportionality coefficient c' by the returning force Te, as shown in the following equation (5):

$$c=c'Te \qquad (5)$$

When equation (5) is substituted into the following equation (6), the returning speed of the operating unit 1 is a constant independent of the returning force Te. This shows that the operating unit 1 is moved at a constant speed represented by 1/c':

$$\dot{\theta} = \frac{Te}{c'Te} = \frac{1}{c'} \qquad (6)$$

What is claimed is:

1. A force-feedback input device comprising:

an operating unit manipulated by an operator;

a detecting unit for detecting an operational state of the operating unit;

a force-feedback unit for providing a force feedback to the operating unit; and a controlling unit for controlling operation of the force-feedback unit based on detection signals output from the detecting unit, the controlling unit comprising:

a returning-force-calculating subunit for calculating a returning force based on an operating position of the operating unit;

a damping-force-calculating subunit for calculating a damping force based on an operation speed and a damping coefficient of the operating unit; and a resultant-force-calculating subunit for calculating a resultant force based on the returning force and the damping force, wherein the damping-force-calculating subunit calculates the damping coefficient based on the returning force.

2. The force-feedback input device according to claim 1, wherein the damping-force-calculating subunit calculates the damping coefficient by multiplying the returning force by a proportionality coefficient.

3. The force-feedback input device according to claim 1, wherein the returning force gradually increases from a returning start point to a predetermined position.

* * * * *